US011451982B2

(12) United States Patent
Nagaraja et al.

(10) Patent No.: US 11,451,982 B2
(45) Date of Patent: Sep. 20, 2022

(54) RECEIVER BEAMFORMING FOR SERVING AND NEIGHBOR CELL MEASUREMENTS

(71) Applicant: QUALCOMM Incorporated, San Diego, CA (US)

(72) Inventors: Sumeeth Nagaraja, Los Altos, CA (US); Raghu Narayan Challa, San Diego, CA (US); Ruhua He, San Diego, CA (US); Arvind Vardarajan Santhanam, San Diego, CA (US); Yong Li, San Diego, CA (US); Muhammad Nazmul Islam, Littleton, MA (US); Bilal Sadiq, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/986,925

(22) Filed: Aug. 6, 2020

(65) Prior Publication Data

US 2020/0367075 A1    Nov. 19, 2020

Related U.S. Application Data

(62) Division of application No. 16/013,807, filed on Jun. 20, 2018, now Pat. No. 10,863,366.

(Continued)

(51) Int. Cl.
*H04W 24/02* (2009.01)
*H04B 7/0408* (2017.01)
(Continued)

(52) U.S. Cl.
CPC .......... *H04W 24/02* (2013.01); *H04B 7/0408* (2013.01); *H04B 7/0695* (2013.01);
(Continued)

(58) Field of Classification Search
None
See application file for complete search history.

(56) References Cited

U.S. PATENT DOCUMENTS 9,391,361 B2    7/2016 Niu et al.
9,674,757 B2    6/2017 Yiu et al.
(Continued)

FOREIGN PATENT DOCUMENTS

CN    1914935 A    2/2007
CN    106159464 A    11/2016
(Continued)

OTHER PUBLICATIONS

U.S. Appl. No. 62/505,945 (Year: 2017).*
(Continued)

*Primary Examiner* — Andre Tacdiran
(74) *Attorney, Agent, or Firm* — Danai Nelisile Mhembere; Patterson & Sheridan, LLP

(57) ABSTRACT

Aspects of the present disclosure relate to receiver beamforming for serving and neighbor cell measurements. An exemplary method generally includes communicating with one or more base stations using a first beam type, initiating a transition to communicating with at least one of the one or more base stations using a second beam type in response to an indication of a trigger event, and communicating with the at least one of the one or more base stations using the second beam type.

28 Claims, 8 Drawing Sheets

Related U.S. Application Data

(60) Provisional application No. 62/524,351, filed on Jun. 23, 2017.

(51) Int. Cl.
*H04W 36/30* (2009.01)
*H04B 7/08* (2006.01)
*H04B 7/06* (2006.01)
*H04W 72/12* (2009.01)
*H04W 72/04* (2009.01)

(52) U.S. Cl.
CPC ............ *H04B 7/086* (2013.01); *H04B 7/088* (2013.01); *H04W 36/30* (2013.01); *H04W 72/046* (2013.01); *H04W 72/12* (2013.01)

(56) References Cited

U.S. PATENT DOCUMENTS

| | | | |
|---|---|---|---|
| 2005/0136929 A1* | 6/2005 | Iacono | H01Q 3/2605 455/436 |
| 2005/0176385 A1 | 8/2005 | Stern-Berkowitz et al. | |
| 2005/0176468 A1* | 8/2005 | Iacono | H04B 7/0695 455/562.1 |
| 2005/0176469 A1* | 8/2005 | Stern-Berkowitz | H04W 36/00835 455/562.1 |
| 2005/0285803 A1 | 12/2005 | Iacono et al. | |
| 2006/0223573 A1* | 10/2006 | Jalali | H04W 36/0085 455/552.1 |
| 2006/0286974 A1 | 12/2006 | Gore et al. | |
| 2014/0055302 A1 | 2/2014 | Jia | |
| 2015/0249929 A1* | 9/2015 | Irie | H04B 7/0695 370/329 |
| 2016/0006122 A1* | 1/2016 | Seol | H04B 7/0408 342/372 |
| 2017/0070275 A1 | 3/2017 | Jo et al. | |
| 2017/0141892 A1 | 5/2017 | Lu et al. | |
| 2017/0353904 A1* | 12/2017 | Kim | H04L 5/0048 |
| 2018/0131426 A1* | 5/2018 | Lee | H04B 7/0695 |
| 2018/0152869 A1* | 5/2018 | Cedergren | H04W 36/30 |
| 2018/0192347 A1* | 7/2018 | Shaheen | H04W 36/36 |
| 2018/0198583 A1 | 7/2018 | Lin et al. | |
| 2018/0199226 A1 | 7/2018 | Tsai et al. | |
| 2018/0279145 A1 | 9/2018 | Jung et al. | |
| 2018/0279187 A1 | 9/2018 | Zingler | |
| 2018/0332520 A1* | 11/2018 | Cheng | H04W 36/0016 |
| 2018/0376351 A1 | 12/2018 | Nagaraja et al. | |
| 2019/0074880 A1 | 3/2019 | Frenne et al. | |
| 2019/0104549 A1 | 4/2019 | Deng et al. | |
| 2019/0273583 A1* | 9/2019 | Ugurlu | H04W 24/10 |
| 2019/0335367 A1* | 10/2019 | Yue | H04W 36/0072 |
| 2020/0068616 A1 | 2/2020 | Qian et al. | |
| 2020/0120565 A1* | 4/2020 | Cedergren | H04W 36/06 |
| 2021/0144600 A1* | 5/2021 | Tidestav | H04W 24/10 |

FOREIGN PATENT DOCUMENTS

| | | | |
|---|---|---|---|
| EP | 1387598 A1 | | 2/2004 |
| KR | 20180050025 A | * | 5/2018 |
| WO | 2007143427 A2 | | 12/2007 |

OTHER PUBLICATIONS

International Preliminary Report on Patentability—PCT/US2018/038797, The International Bureau of WIPO—Geneva, Switzerland, dated Jan. 2, 2020.

International Search Report and Written Opinion—PCT/US2018/038797—ISA/EPO—dated Sep. 24, 2018.

Asustek: "Considerations on UE Beamforming Management," 3GPP TSG RAN WG1 Meeting #89, R1-1709046, Hangzhou, P.R. China, May 15-19, 2017, 3 pages.

* cited by examiner

RECEIVER BEAMFORMING FOR SERVING AND NEIGHBOR CELL MEASUREMENTS

CLAIM OF PRIORITY UNDER 35 U.S.C. § 120

This application is a divisional of U.S. Non-Provisional patent application Ser. No. 16/013,807 filed Jun. 20, 2018, which claims priority to and benefit of U.S. Provisional Patent Application Ser. No. 62/524,351, filed Jun. 23, 2017, which are hereby assigned to the assignee hereof and hereby expressly incorporated by reference herein in their entireties as if fully set forth below and for all applicable purposes.

TECHNICAL FIELD

Aspects of the present disclosure relate to wireless communications, and more particularly, receiver beamforming for serving and neighbor cell measurements.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communication that may be performed, for example, by a UE. The method includes communicating with one or more base stations using a first beam type, initiating a transition to communicating with at least one of the one or more base stations using a second beam type in response to an indication of a trigger event, and communicating with the at least one of the one or more base stations using the second beam type.

Certain aspects of the present disclosure provide an apparatus for wireless communication by a UE. The apparatus generally includes at least one processor configured to communicate with one or more base stations using a first beam type, initiate a transition to communicating with at least one of the one or more base stations using a second beam type in response to an indication of a trigger event, and communicate with the at least one of the one or more base stations using the second beam type. Additionally, the apparatus also includes a memory coupled with the at least one processor.

Certain aspects of the present disclosure provide an apparatus for wireless communication by a UE. The apparatus generally includes means for communicating with one or more base stations using a first beam type, means for initiating a transition to communicating with at least one of the one or more base stations using a second beam type in response to an indication of a trigger event, and means for communicating with the at least one of the one or more base stations using the second beam type.

Certain aspects of the present disclosure provide non-transitory computer-readable medium for wireless communication by a user equipment (UE). The non-transitory computer-readable medium generally includes instructions that, when executed by at least one processor, configure the at least one processor to communicate with one or more base stations using a first beam type, initiate a transition to communicating with at least one of the one or more base stations using a second beam type in response to an indication of a trigger event, and communicate with the at least one of the one or more base stations using the second beam type.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
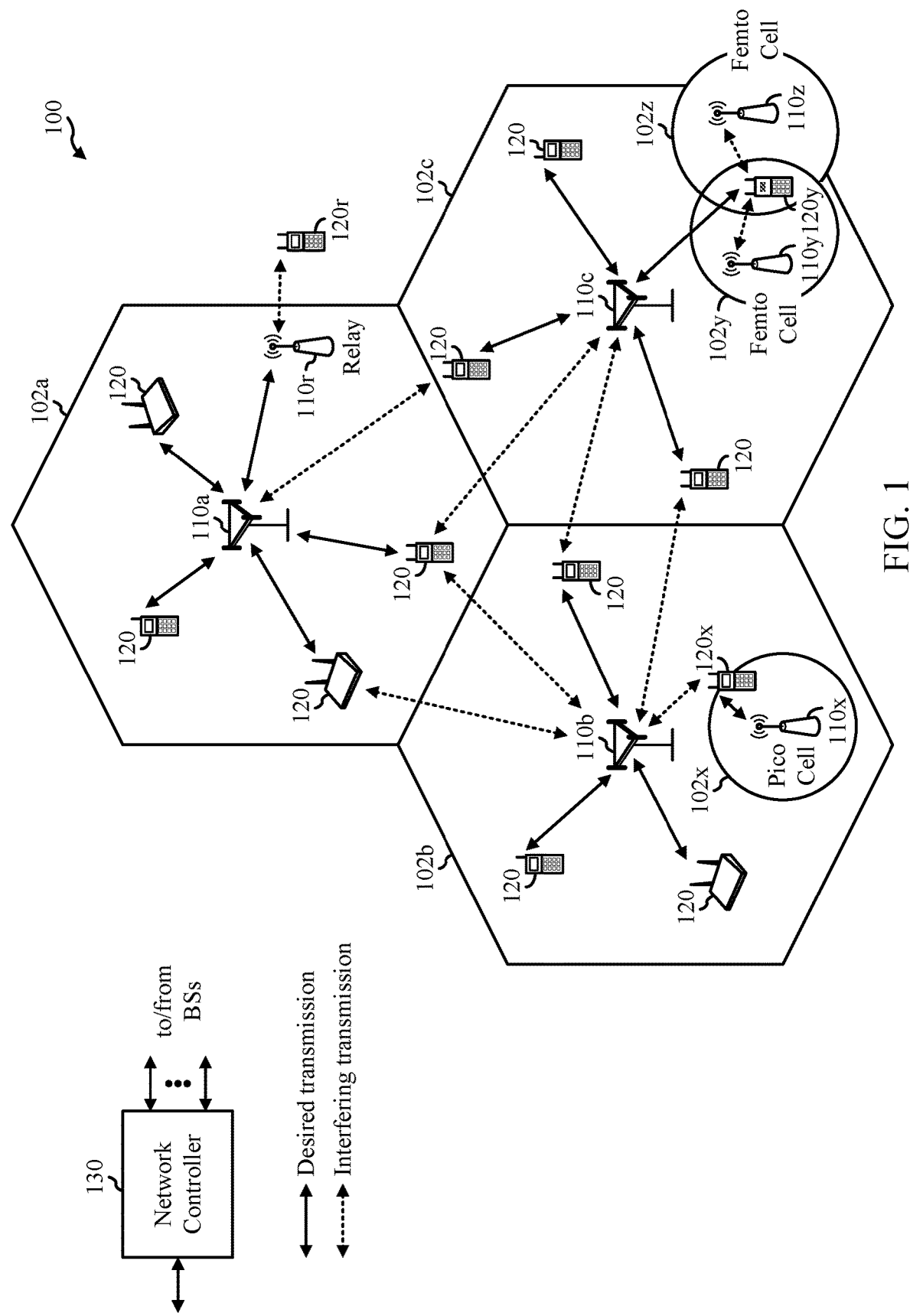
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate over active beam-formed transmission beams. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

Figure 8:
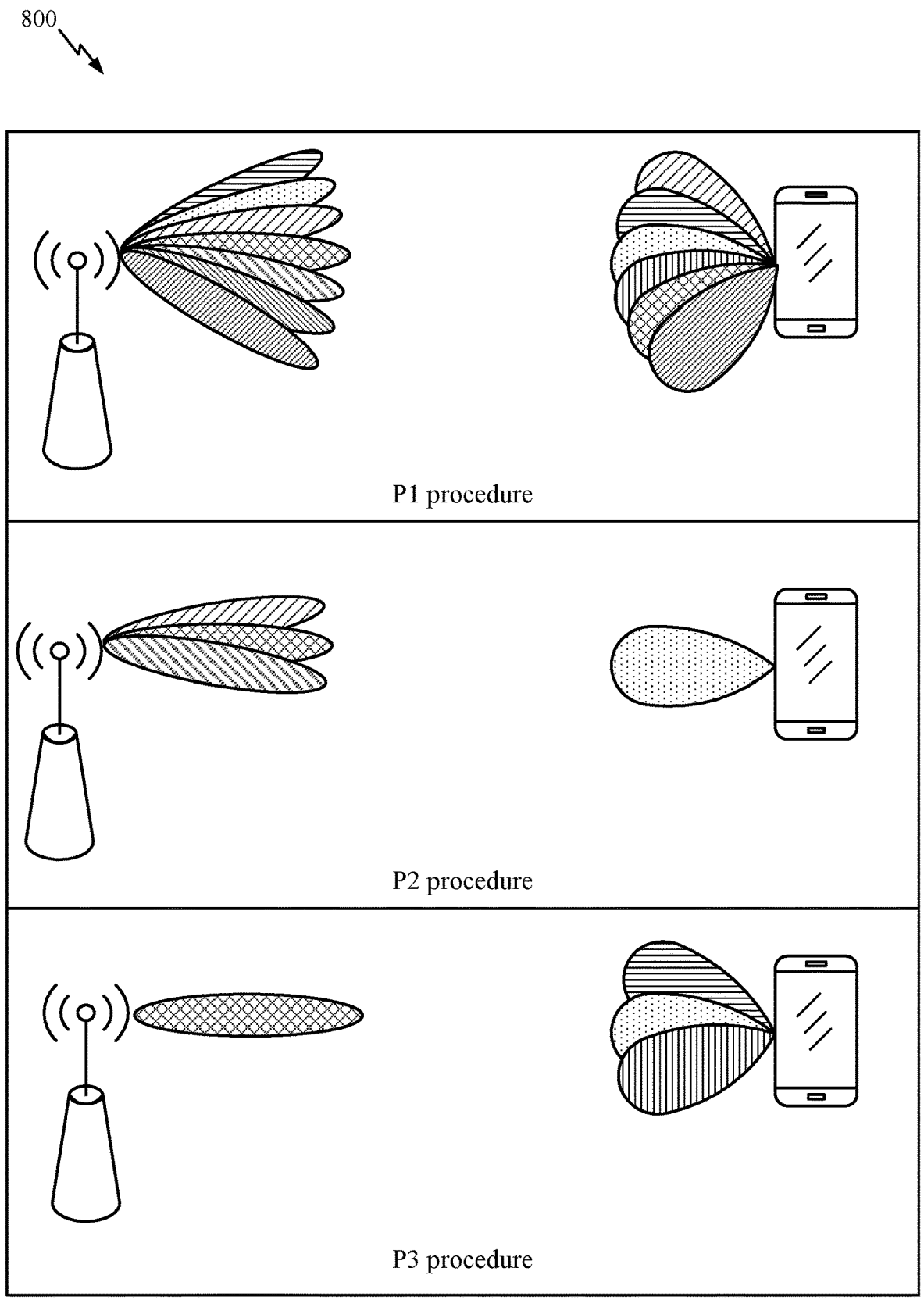
FIG. 8 illustrates an example of a P1, P2, and P3 procedure, in accordance with certain aspects of the present disclosure.

FIG. 1 illustrates an example wireless network 100 in which aspects of the present disclosure may be performed. According to an example, the wireless network may be a 5G NR network which may support millimeter wave (mmW) communication. mmW communication depends on beamforming to meet link margin and may use directional beamforming such that transmission of signaling is directional (e.g., as opposed to omnidirectional). Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 900 and methods described herein for UE receiver beamforming. BS 110 may comprise a transmission reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
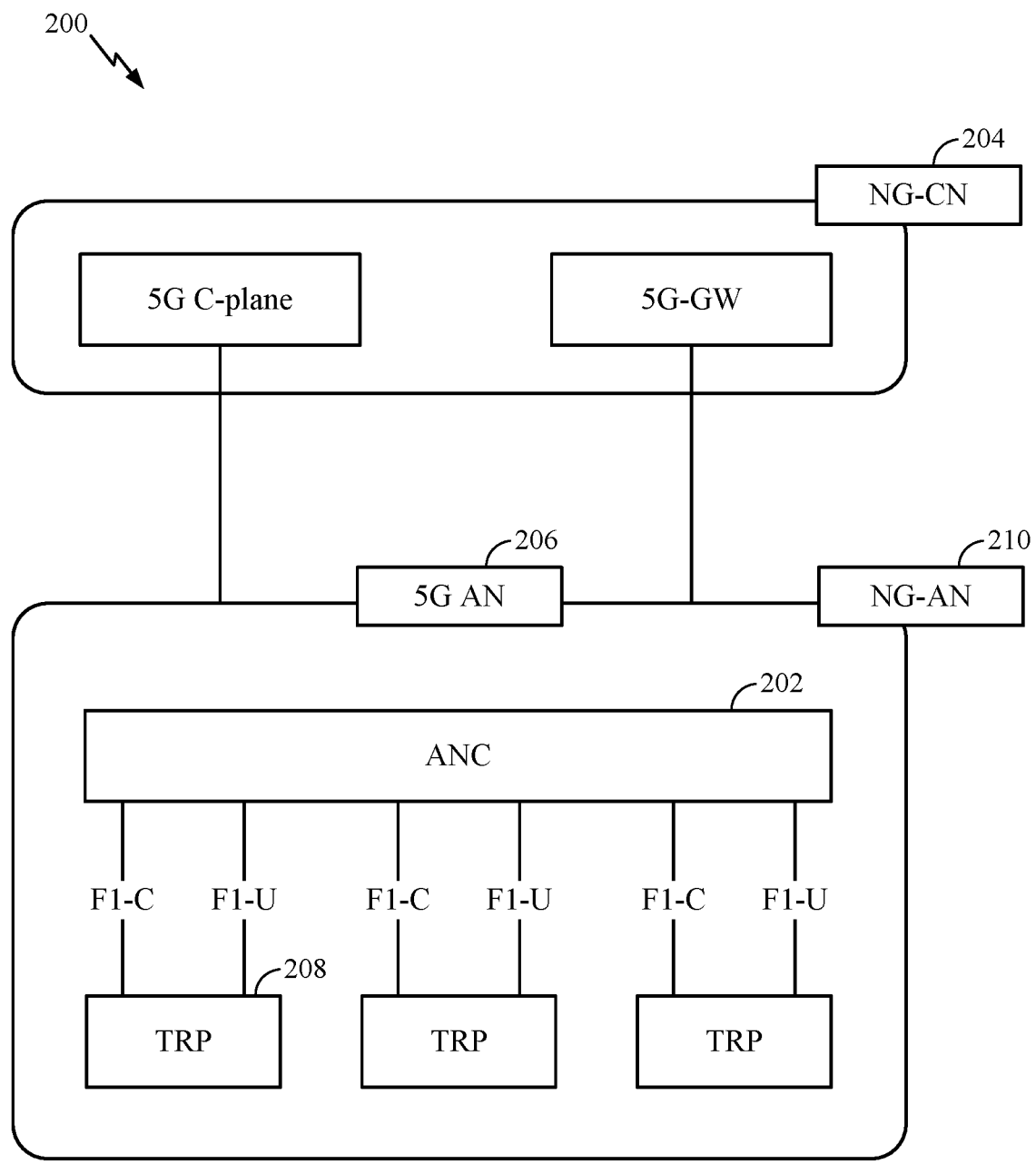
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
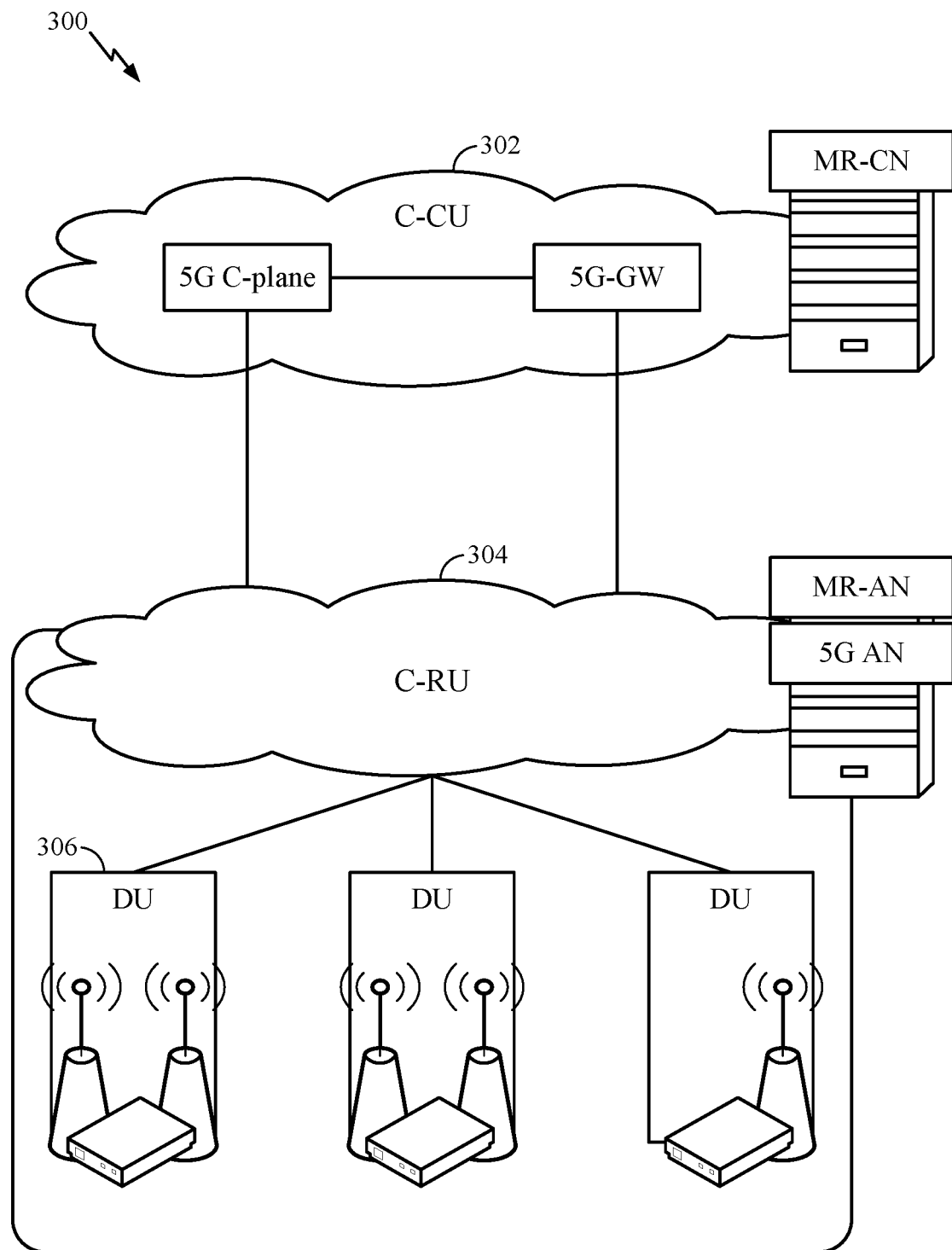
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
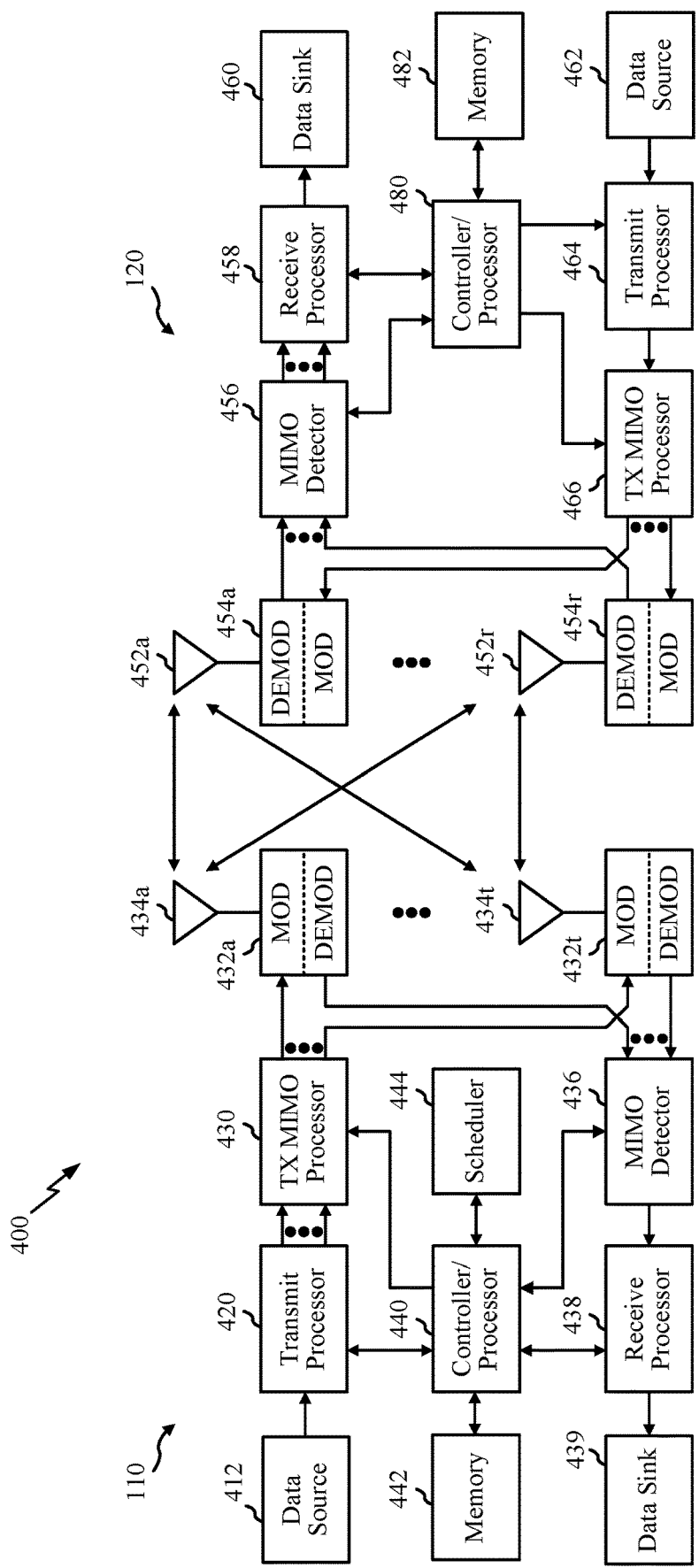
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIG. 9. According to an example, antennas 434, DEMOD/MOD 432, processors 430, 420, 438 and/or controller/processor 440 of the BS 110 may be used to perform the operations described herein and illustrated with reference to FIGS. 10-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 9, and/or other processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
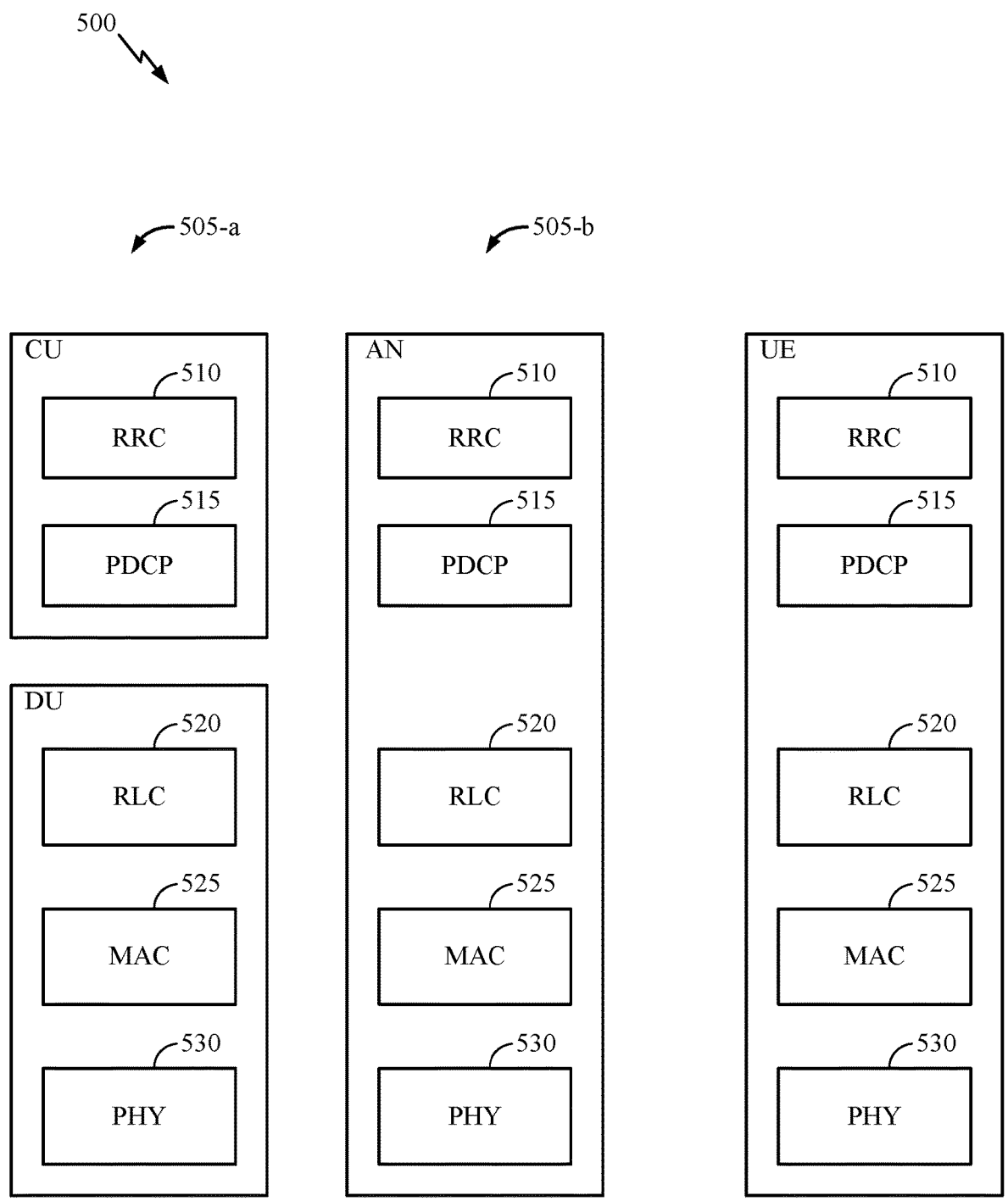
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
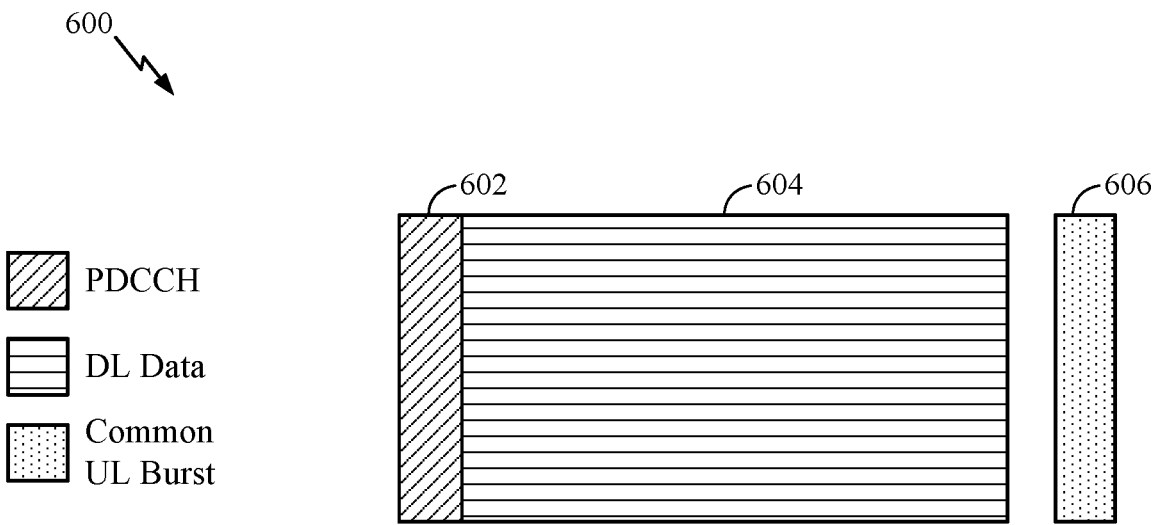
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PD SCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
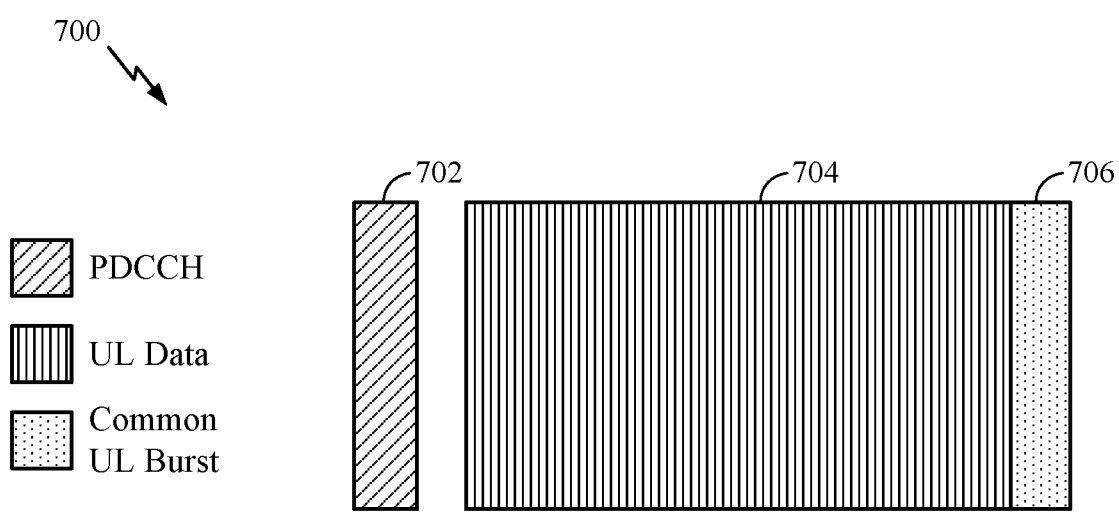
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Refinement Procedure

As noted above, in certain multi-beam systems (e.g., millimeter wave (mmW) cellular systems), beam forming may be needed to overcome high path-losses. As described herein, beamforming may refer to establishing a link between a BS and UE, wherein both of the devices form a beam corresponding to each other. Both the BS and the UE find at least one adequate beam to form a communication link. B S-beam and UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs.

At least one BPL has to be established for network access. As described above, new BPLs may need to be discovered later for different purposes. The network may decide to use different BPLs for different channels, or for communicating with different BSs (TRPS) or as fall-back BPLs in case an existing BPL fails.

The UE typically monitors the quality of a BPL and the network may refine a BPL from time to time.

FIG. 8 illustrates example 800 for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 8, the BS transmits different symbols of a reference signal, each beam formed in a different spatial direction such that several (most, all) relevant places of the cell are reached. Stated otherwise, the BS transmits beams using different transmit beams over time in different directions.

For successful reception of at least a symbol of this "P1-signal", the UE has to find an appropriate receive beam. It searches using available receive beams and applying a different UE-beam during each occurrence of the periodic P1-signal.

Once the UE has succeeded in receiving a symbol of the P1-signal it has discovered a BPL. The UE may not want to wait until it has found the best UE receive beam, since this may delay further actions. The UE may measure the reference signal receive power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 8). The BS-beams used for P2 may be different from those for P1 in that they may be spaced closer together or they may be more focused. The UE may measure the RSRP for the various BS-beams and indicate the best one to the BS.

The P3 procedure refines the UE-beam of a BPL (see P3 procedure in FIG. 8). While the BS-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the BS.

Overtime, the BS and UE establish several BPLs. When the BS transmits a certain channel or signal, it lets the UE know which BPL will be involved, such that the UE may tune in the direction of the correct UE receive beam before the signal starts. In this manner, every sample of that signal or channel may be received by the UE using the correct receive beam. In an example, the BS may indicate for a scheduled signal (SRS, CSI-RS) or channel (PDSCH, PDCCH, PUSCH, PUCCH) which BPL is involved. In NR this information is called QCL indication.

Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and RRM management functionality.

The BS may use a BPL which the UE has received in the past. The transmit beam for the signal to be transmitted and the previously-received signal both point in a same direction or are QCL. The QCL indication may be needed by the UE (in advance of signal to be received) such that the UE may use a correct receive beam for each signal or channel. Some QCL indications may be needed from time to time when the BPL for a signal or channel changes and some QCL indications are needed for each scheduled instance. The QCL indication may be transmitted in the downlink control information (DCI) which may be part of the PDCCH channel. Because DCI is needed to control the information, it may be desirable that the number of bits needed to indicate the QCL is not too big. The QCL may be transmitted in a medium access control-control element (MAC-CE) or radio resource control (RRC) message.

According to one example, whenever the UE reports a BS beam that it has received with sufficient RSRP, and the BS decides to use this BPL in the future, the BS assigns it a BPL tag. Accordingly, two BPLs having different BS beams may be associated with different BPL tags. BPLs that are based on the same BS beams may be associated with the same BPL tag. Thus, according to this example, the tag is a function of the BS beam of the BPL.

Example Receiver Beamforming for Serving and Neighbor Cell Measurements

Certain wireless systems, such as millimeter wave (mmW) systems, bring gigabit speeds to cellular networks due to availability of large amounts of bandwidth. However, the unique challenges of heavy path-loss faced by such wireless systems necessitate new techniques to address these challenges, such as hybrid beamforming (analog and digital), which are not present in 3G and 4G systems. Hybrid beamforming may enhance link budget/signal to noise ratio (SNR) which can be exploited during the random access channel (RACH) procedure.

In such systems, the node B (NB) and the user equipment (UE) may communicate over active beam-formed transmission beams. Active beams may be considered as paired transmission (Tx) and reception (Rx) beams between the NB and UE which carry data and control channels such as physical downlink shared channel (PDSCH), physical downlink control channel (PDCCH), physical uplink shared channel (PUSCH), and physical uplink control channel (PUCCH).

In order for beamforming to function correctly, the NB may need to monitor beams using beam measurements performed (e.g., based on reference signals transmitted by the NB) and feedback generated at the UE. For example, the NB may monitor active beams using UE-performed measurements of signals such as NR-SS, CSI-RS, DMRS-CSS and DMRS-USS. For example, to monitor active beams, the NB may send measurement request to the UE and may subsequently transmit one or more reference signals for measurement at the UE.

Since the direction of a reference signal is unknown to the UE, the UE may need to evaluate several beams to obtain the best receive (Rx) beam for a given NB transmit (Tx) beam. However, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

Figure 9:
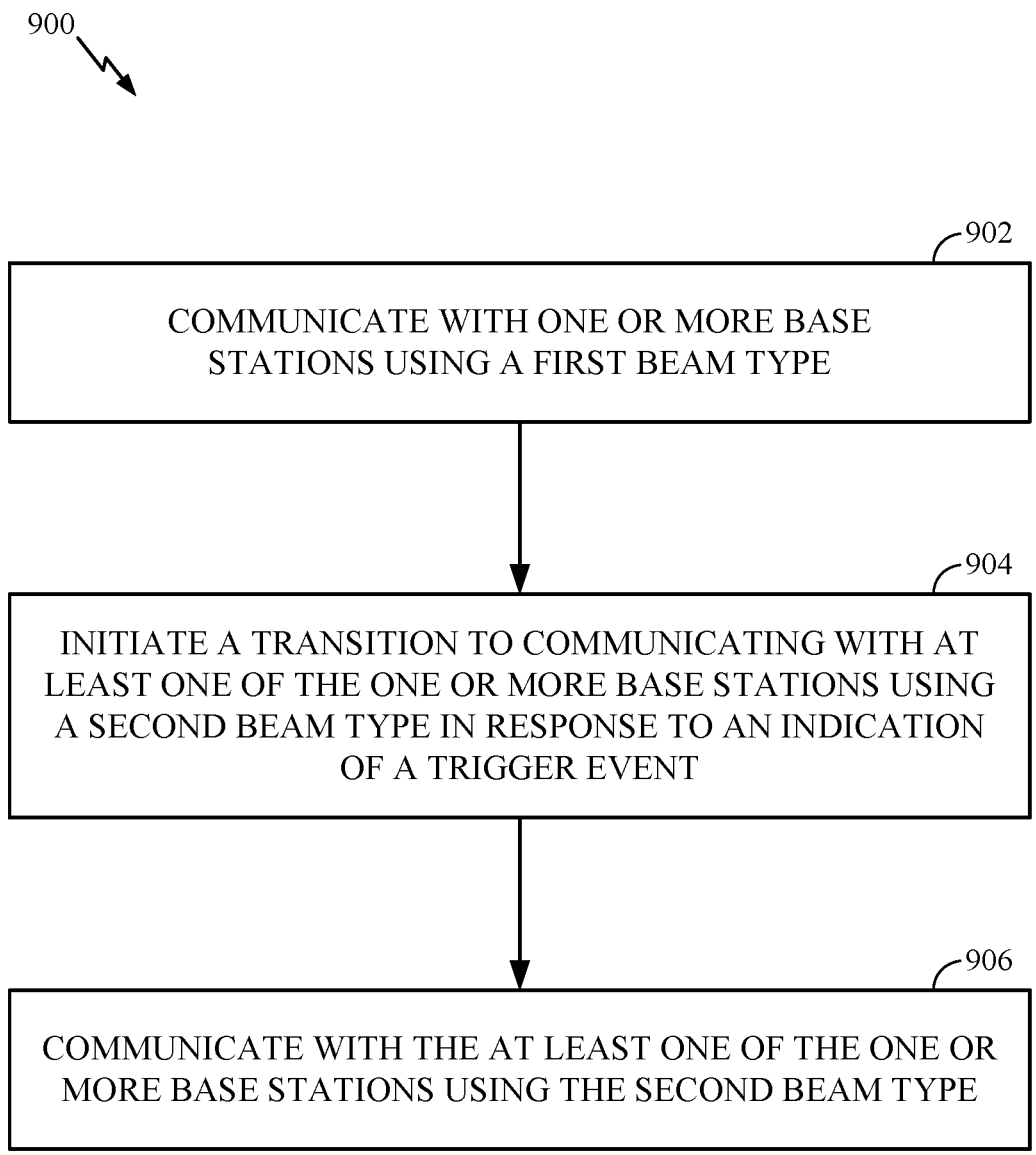
FIG. 9 illustrates an example operations performed by a UE, in accordance with aspects of the present disclosure.

FIG. 9 illustrates example operations 900 for wireless communications. According to certain aspects, operations 900 may be performed by a user equipment (e.g., UE 120) for example to assist in performing measurements of serving and neighbor cells when using Rx beamforming. According to certain aspects, operations 900 may improve reliability of communication and efficiency of power usage at the UE.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein. For example, communicating using the first beam type at 902 may be performed using at least an antenna 452 and a processor 480. Initiating a transition at 904 may be performed using at least the processor 480. Additionally, communicating using the second beam type at 906 may be performed using an antenna 452 and a processor 480.

Operations 900 begin at 902 by communicating with one or more base stations using a first beam type. At 904 the UE initiates a transition to communicating with at least one of the one or more base stations using a second beam type in response to an indication of a trigger event. At 906, the UE communicates with the at least one of the one or more base stations using the second beam type.

As noted above, a UE may communicate with one or more base stations using a first beam type. According to aspects, communicating with the one or more base stations may comprise using reference signals (e.g., NR-SS, CSI-RS, DMRS-CSS and DMRS-USS) transmitted by the one or more base stations to perform measurements of signal quality for transmission beams of the first type. Communicating may also include generating measurement reports based on the measurements and sending the measurement reports to the one or more base stations. Additionally, communicating may include receiving data on one or more of a physical downlink control channel (PDCCH), a physical downlink shared channel (PDSCH), a reference signal, and/or transmitting on a physical uplink control channel (PUCCH) or a physical uplink shared channel (PUSCH).

In some cases, in response to a trigger event, the UE may initiate a transition to communicating with at least one of the one or more base stations using a second beam type from using the first beam type. According to aspects, beam types may comprise at least one of a directional (e.g., refined) transmission beam type or an omni-directional/pseudo-omni directional transmission beam type. According to aspects, in some cases, the trigger event may comprise a signal quality or link gain rising above or falling below a threshold, such as −80 dBm. It should be noted that −80 dBm is merely used as an example and that the threshold could be set to a ling gain different than −80 dBm.

For example, in some cases, the UE may measure reference signals from the one or more base stations using one or more directional (e.g., refined) beams. According to aspects, when a signal quality of the one or more beams directional beams (e.g., as determined based on the measurements of the reference signals) reaches or exceeds the threshold (e.g., an event A1), the UE may initiate a transition to communicating with the one or more base stations using beams of a second type, such as omni-directional/pseudo-omni directional transmission beams. Thereafter, the UE may communicate with the one or more base stations using the omni-directional/pseudo-omni-directional transmission beams (e.g., by receiving/transmitting data on one or more of a PDCCH, PDSCH, PUCCH, and/or PUSCH). According to aspects, in such a case, since the link gain (e.g., the signal quality) is at or above the threshold, in order to save power, the UE may transition away from using more resource-intensive beams, such as directional beams which consume significant power and processing resources at the UE, to using less resource-intensive beams, such as omni-directional/pseudo-omni directional transmission beams. Moreover, by transitioning to the omni-directional/pseudo-omni directional transmission beams the UE does not have to continue to perform beam refinement (thus saving power resources).

Additionally, in some cases, the UE may measure reference signals from the one or more base stations using one or more omni-directional/pseudo-omni directional transmission beams. According to aspects, when a signal quality of the one or more omni-directional/pseudo-omni directional transmission beams falls below the threshold (e.g., an event A2), the UE may initiate a transition to communicating with one or more directional (e.g., refined beams). Thereafter, the UE may communicate with the one or more base stations using the directional transmission beams. According to aspects, in such a case, since the link gain (e.g., signal quality) is poor (e.g., below the threshold), the UE may need to transition to using more-refined, directional beams which provide better link gain than an omni-directional and/or pseudo-omni-directional transmission beam.

According to aspects, as part of the transition from using an omni-directional or pseudo-omni-directional beam to a directional/refined beam, the UE may perform a beam refinement procedure by providing (e.g., transmitting) a beam refinement request to the one or more base stations. For example, the UE may include a beam refinement procedure request within the measurement report that is sent back to the one or more base stations in response to the measurements made on the reference signals. According to aspects, the beam refinement procedure may comprise one or more of a P1, a P2, or a P3 type beam refinement procedure, for example, as described above with reference to FIG. 8.

According to aspects, in response to receiving a beam refinement procedure request of a particular type (e.g., P1, P2, or P3) from the UE, the base station may send reference signals associated with that type of beam refinement procedure. For example, if the UE requests a P3 procedure, as described above, the base station may transmit P3 type reference signals in order for the UE to refine its Rx beams. According to certain aspects, these reference signals may be quasi-collocated (QCLed) with beam-ids identified by the UE in the measurement report. For example, with reference to a P2 refinement procedure, the base station may transmit reference signals over beam1, beam2, beamN to the UE. The UE performs measurements on these beams and sends a measurement report. According to aspects, this measurement report may contain the top 'K' beams and reference signal received power (RSRP)/reference signal received quality (RSRQ) values corresponding to these beams. Now, for a P3 procedure, the base station may instruct the UE to refine its beam based on one of the UE-reported beams (e.g., beam3).

According to aspects, by using the techniques described above, the UE may intelligently determine when it needs to use more refined/resource-intensive directional beams and when it can use less resource-intensive omni-directional/pseudo-omni-directional beams. Doing so may allow the UE to not have to sweep through all Rx beams, thereby reducing measurement delay, improving battery life, and improving processing resource efficiency.

According to aspects, similar techniques may also be used by the UE when performing a mobility procedure, such as when handing off from a serving base station to a target base station.

For example, in some cases, during mobility, the UE may perform measurements on both its serving base station and one or more target base stations (e.g., neighboring the UE). According to aspects, in some cases, the UE may use broad beams, such as omni-directional/pseudo-omni directional transmission beams, to perform the measurements on reference signals transmitted by the serving base station and the target base station.

According to aspects, when a trigger event occurs (e.g., when the link gain/signal quality of the target base station falls below the threshold), the UE may transition to communicating with the target base station using one or more directional beams. For example, as part of the transition, the UE may transmit a measurement report to the target base station, indicating that the link gain has fallen below the threshold. According to aspects, the indication that the link gain has fallen below the threshold may be based on an aggregate link gain of the transmission beams used to transmit the reference signals by the target base station. Additionally, as part of the measurement report, the UE may request a beam refinement procedure (e.g., P1) to refine its Rx beams.

According to certain aspect, in some cases, the UE may select, or the target base station may indicate, which beams to perform the beam refinement procedure on. For example, the UE may select the beams of the target base station (or serving base station) to perform the beam refinement, for example, based on the selected beams' link gain. For example, in some cases, the UE may determine that a first Tx beam of the target base station is good, that a second Tx beam of the target base station is 10 dB less than the first Tx beam, and that all other Tx beams of the target base station are poor. In such a case, the UE may select only the first and second Tx beams to further refine its own Rx/Tx beam, for example, since these Tx beams already provide a decent link gain (e.g., which will be further improved in response to the beam refinement procedure). According to aspects, the UE may include the beam IDs of the selected beams (e.g., determined based on which symbols the reference signals corresponding to the selected beams are transmitted on) in the measurement report when requesting the beam refinement procedure (e.g., a P1 beam refinement procedure) upon sending a RACH to the target NB.

According to aspects, in response to receiving a beam refinement procedure request of a particular type from the UE, the base station may send reference signals associated with that type of beam refinement procedure. According to certain aspects, these reference signals may be QCLed with beam-IDs identified by the UE in the measurement report.

In some cases, the trigger event may be a hand over (HO) command from the target base station (e.g., received from the serving base station). For example, in response to receiving a HO command from the target base station, the UE may initiate a transition from communicating with the target base station with an omni-directional beam to refining its Rx beam for the target base station to one or more directional/refined beams. Additionally, in response to the HO command, the UE may transmit a beam refinement procedure request over a contention-free random access channel or a contention based random access channel to the target base station in order to refine its Rx beams.

According to aspects, in some cases, the HO command may comprise beam information, indicating which beams the UE should perform beam refinement on. For example, in some cases, the HO command may indicate that the UE should perform refinement on beams 1 and 2. In response, the UE may attempt to receive and measure reference signals transmitted by the target base station one beams 1 and 2 (e.g., according to the particular type of beam refinement procedure requested by the UE). According to aspects, based on the measurements, the UE may refine beams 1 and 2, thereby allowing more efficient communication with the target base station on these beams.

In some cases, during mobility, the UE may use finer, directional beams when communicating with its serving base station and may use broad, omni-directional/pseudo-omni-directional beams when communicating with one or more target/neighbor base stations. In such a case, the UE may apply a fixed offset based on its beam forming capability for measurements made while communicating with the one or more target base station. For example, when communicating with serving base station, the UE may measure an RS with refined beam of gain 10 dBi. Further, when measuring an RS of the target/neighbor base station it may measure an RS with 'pseudo-omni' beam of gain 5 dBi. Accordingly, since the UE knows the difference in beam-forming gains between the "refined beam" and "pseudo-omni" beam, when sending the measurement reports, the UE may apply a fixed offset (e.g., 5 dB) to serving or target base station measurements.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Additionally, it should be noted that the techniques described with relation to mobility may equally apply to non-mobility scenarios described above and vice versa.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication at a user equipment (UE), comprising:
   communicating with a target base station using an omni-directional or pseudo omni-directional beam type;
   receiving an indication of a trigger event comprising an indication of a handoff from a serving base station to the target base station; and
   in response to receiving the indication, initiating a transition from communicating with the target base station using the omni-directional or pseudo omni-directional beam type to communicating with the target base station using a directional beam type and
   communicating with the target base station using the directional beam type.

2. The method of claim 1, further comprising
   communicating with the serving base station using the omni-directional or pseudo omni-directional beam type,
   wherein: communicating with the serving base station and the target base station using the omni-directional or pseudo omni-directional beam type comprises:
   measuring reference signals of the serving base station and the target base station using the omni-directional or pseudo omni-directional beam type.

3. The method of claim 2,
   wherein initiating the transition from communicating with the target base station using the omni-directional or pseudo omni-directional beam type to communicating with the target base station using the directional beam type comprises initiating a beam refinement procedure for communication between the UE and the target base station.

4. The method of claim 3,
   wherein initiating the beam refinement procedure for communication between the UE and the target base station comprises selecting a first number of beams to perform the refinement procedure on.

5. The method of claim 4, wherein the selecting the first number of beams is based on a signal quality associated with the first number of beams.

6. The method of claim 4, wherein:
the indication of the handoff comprises beam information indicating a number of beams to perform the beam refinement procedure on, and
the first number of beams is selected based on the beam information.

7. The method of claim 1, further comprising,
measuring reference signals of the serving base station using the directional beam type,
wherein communicating with the target base station using the omni-directional or pseudo omni-directional beam type comprises measuring reference signals of the target base station using the omni-directional or pseudo omni-directional beam type.

8. The method of claim 7, further comprising
applying a fixed offset to the measurements of the reference signals of the target base station relative to the measurements of the reference signals of the serving base station.

9. An apparatus for wireless communication by a user equipment (UE), comprising:
at least one processor configured to:
communicate with a target base station using a omni-directional or pseudo omni-directional beam type;
receive an indication of a trigger event comprising an indication of a handoff from a serving base station to the target base station; and
in response to receiving the indication, initiate a transition from communicating with the target base station using the omni-directional or pseudo omni-directional beam type to communicating with the target base station using a directional beam type and communicate with the target base station using the directional beam type; and
a memory coupled with the at least one processor.

10. The apparatus of claim 9, wherein: the at least one processor is further configured to
communicate with the serving base station using the omni-directional or pseudo omni-directional beam type, and
in order to communicate with the serving base station and the target base station using the omni-directional or pseudo omni-directional beam type, the at least one processor is further configured to measure reference signals of the serving base station and the target base station using the omni-directional or pseudo omni-directional beam type.

11. The apparatus of claim 10,
wherein, in order to initiate the transition from communicating with the target base station using the omni-directional or pseudo omni-directional beam type to communicating with the target base station using the directional beam type, the at least one processor is further configured to initiate a beam refinement procedure for communication between the UE and the target base station.

12. The apparatus of claim 11,
wherein, in order to initiate the beam refinement procedure for communication between the UE and the target base station, the at least one processor is further configured to select a first number of beams to perform the refinement procedure on.

13. The apparatus of claim 12,
wherein the at least one processor is configured to select the first number of beams based on a signal quality of the first number of beams.

14. The apparatus of claim 12, wherein:
the indication of the handoff comprises beam information indicating a number of beams to perform the beam refinement procedure on, and
the first number of beams is selected based on the beam information.

15. The apparatus of claim 9, wherein: the at least one processor is further configured to
measure reference signals of the serving base station using the omni-directional or pseudo omni-directional beam type, and
in order to communicate with the target base station using the directional beam type, the at least one processor is further configured to measure reference signals of the target base station using the directional beam type.

16. The apparatus of claim 15, wherein the at least one processor is further configured to apply a fixed offset to the measurements of the reference signals of the target base station relative to the measurements of the reference signals of the serving base station.

17. An apparatus for wireless communication by a user equipment (UE), comprising:
means for communicating with a target base station using a omni-directional or pseudo omni-directional beam type;
means for receiving an indication of a trigger event comprising an indication of a handoff from a serving base station to the target base station; and
means for, in response to receiving the indication, initiating a transition from communicating with the target base station using the omni-directional or pseudo omni-directional beam type to communicating with the target base station using a directional beam type and communicating with the target base station using the directional beam type.

18. The apparatus of claim 17, further comprising
means for communicating with the serving base station using the omni-directional or pseudo omni-directional beam type,
wherein the means for communicating with the serving base station using the omni-directional or pseudo omni-directional beam type and the means for communicating with target base station using the omni-directional or pseudo omni-directional beam type comprise means for measuring reference signals of the serving base station and the target base station using the omni-directional or pseudo omni-directional beam type.

19. The apparatus of claim 18,
wherein the means for initiating the transition from communicating with the target base station using the omni-directional or pseudo omni-directional beam type to communicating with the target base station using the directional beam type comprises means for initiating a beam refinement procedure for communication between the UE and the target base station.

20. The apparatus of claim 19,
wherein the means for initiating the beam refinement procedure for communication between the UE and the target base station comprises means for selecting a first number of beams to perform the refinement procedure on.

21. The apparatus of claim 20, wherein the means for selecting the first number of beams is based on a signal quality associated with the first number of beams.

22. The apparatus of claim 20, wherein:
the indication of the handoff comprises beam information indicating a number of beams to perform the beam refinement procedure on, and
the first number of beams is selected based on the beam information.

23. A non-transitory computer-readable medium for wireless communication by a user equipment (UE), comprising instructions that, when executed by at least one processor, cause the at least one processor to:
communicate with a serving base station and a target base station using a omni-directional or pseudo omni-directional beam type;
receive an indication of a trigger event comprising an indication of a handoff from a serving base station to the target base station; and
in response to receiving the indication, initiate a transition from communicating with the target base station using the omni-directional or pseudo omni-directional beam type to communicating with the target base station using a directional beam type and communicate with the target base station using the directional beam type.

24. The non-transitory computer-readable medium of claim 23, further comprising instructions that cause the at least one processor to
communicate with the serving base station using the omni-directional or pseudo omni-directional beam type,
wherein the instructions that cause the at least one processor to communicate with the serving base station and the target base station using the omni-directional or pseudo omni-directional beam type comprise instructions that cause the at least one processor to measure reference signals of the serving base station and the target base station using the omni-directional or pseudo omni-directional beam type.

25. The non-transitory computer-readable medium of claim 24, wherein the instructions that cause the at least one processor to initiate the transition from communicating with the target base station using the omni-directional or pseudo omni-directional beam type to communicating with the target base station using the directional beam type comprise instructions that cause the at least one processor to initiate a beam refinement procedure for communication between the UE and the target base station.

26. The non-transitory computer-readable medium of claim 25,
wherein the instructions that cause the at least one processor to initiate the beam refinement procedure for communication between the UE and the target base station comprise instructions that cause the at least one processor to select a first number of beams to perform the refinement procedure on.

27. The non-transitory computer-readable medium of claim 26,
wherein the selection of the first number of beams is based on a signal quality associated with the first number of beams.

28. The non-transitory computer-readable medium of claim 26, wherein:
the indication of the handoff comprises beam information indicating a number of beams to perform the beam refinement procedure on, and
the first number of beams is selected based on the beam information.

* * * * *